J. JOHNSON.
Improvement in Bridges.
No. 129,479. Patented July 16, 1872.
Fig. 1
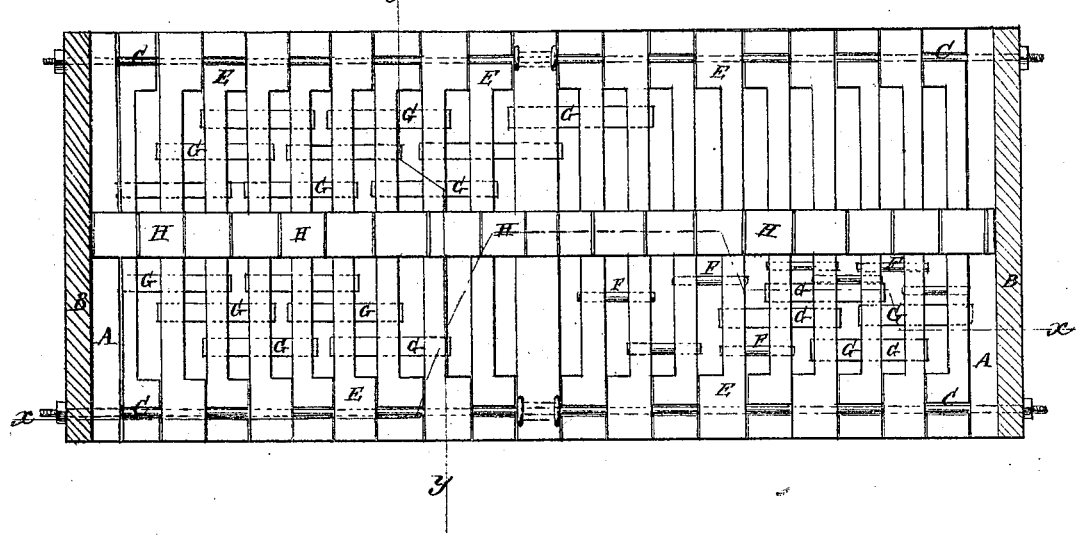
Fig. 2
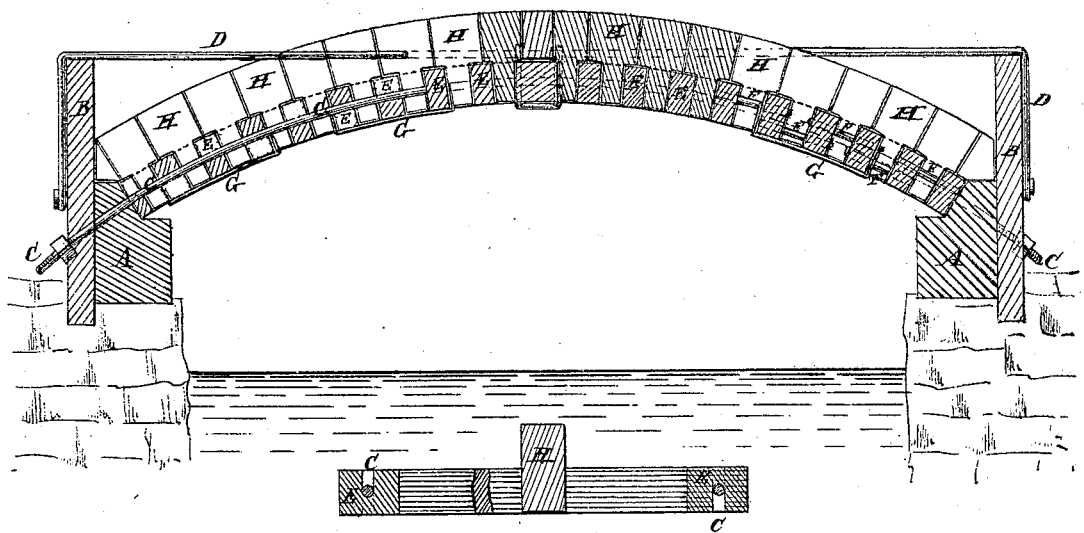
Fig. 3
Witnesses:
A. W. Almqvist
Geo. W. Mabee
Inventor:
J. Johnson
Per Munn & Co.
Attorneys.

UNITED STATES PATENT OFFICE.

JOHN JOHNSON, OF MOTT HAVEN, NEW YORK.

IMPROVEMENT IN BRIDGES.

Specification forming part of Letters Patent No. 129,479, dated July 16, 1872.

Specification describing a new and useful Improvement in Bridges, invented by JOHN JOHNSON, of Mott Haven, in the county of Westchester and State of New York.

Figure 1 is a top view of my improved bridge. Fig. 2 is a detail longitudinal sectional view of the same taken through the irregular line $x\ x$, Fig. 1. Fig. 3 is a detail cross-section of the same taken through the irregular line $y\ y$, Fig. 1.

My invention has for its object to furnish an improved mode of building arched bridges and other arched structures, which shall be simple, convenient, and effective, enabling an arch of any desired span to be formed without previously constructing a form or guide-frame; and it consists in the bridge or arch, and in the mode of forming the arch, as hereinafter more fully described.

A represents the abutments of the bridge or arch, which must be made of sufficient strength to support the weight of the structure and prevent the spread of the arch. B represents towers of sufficient strength to support the cables upon which the arch is suspended, and by which it is supported while being built. C D represent a pair of cables extended across the span of the arch. Any desired number of pairs of cables C D may be used, according to the size and weight of the proposed structure. For ordinary purposes two pairs—one upon each side—will be sufficient. The lower cable C is placed upon the line of the base of the arch, and the upper cable D is placed at such a distance above it that its middle or lowest part may be as high as or a little higher than the top of the arch. One or both ends of the lower cable C or of both cables must be secured to a windlass, capstan, or in other well-known ways, so that they may be tightened or slackened, as may be required. E are the cross-beams that form the arch, which may be made of the same size throughout their entire length, or may be made thicker at their ends, as shown in Fig. 1, so as to leave spaces between their middle parts. The parts of the cross-beams E that come in contact with each other must be so beveled that when placed side by side they may give the required spring or curve to the arch. The cables C D should be connected with each other by adjustable connections, so that the lower cable C may be drawn upward after the application of each cross-beam E, so that the part of the cables C to which the next cross-beam is to be applied may always be in the line of the arch. The parts of the cross-beams E that come in contact with the cables C are notched transversely to receive and fit upon the said cables C, said notches extending into the centers of said beams so that the said cables may be in the centers of the beams, as shown in Figs. 2 and 3. The consecutive beams E may be all notched upon the same side, but I prefer to notch them upon the upper and lower sides alternately, as shown in Figs. 1, 2, and 3.

In forming the arch the first cross-beam at either or both ends is placed upon the cables C and adjusted in place. The cables C are then raised sufficiently to bring the part of the cables upon which the next cross-beam is to be placed into the line of the arch. The second cross-beam is then placed upon the cables C, adjusted in place, and securely fastened to the first beam by means of the bolts E, or their equivalent. The third beam is then placed upon the cables, adjusted in place, bolted to the second beam, and secured to the first beam by straps or bars G, which pass beneath the second beam, and the ends of which are secured to the first and third beams, as shown in Figs. 1 and 2. Successive beams are added in the same way, each succeeding beam being secured to the first preceding beam by bolts F, and to the second preceding beam by the straps or bars G. When the center of the arch is reached a key-beam is fitted in and the arch is completed. The center of the upper cables D may then be connected with the crown of the arch or the upper cables D, or both the cables D C may be removed, as may be desired. The roadway or other structure is then built upon the arch in the ordinary manner.

In cases where great strength is required a secondary arch may be formed above the first or main arch by means of blocks H placed above or below the main arch. When the secondary arch is formed above the main arch and the cross-beams E are made thinner in their middle parts, the blocks H may be made with tenons fitting into the spaces between the said cross-beams E. When the secondary arch is formed below the main arch the blocks H should be bolted or otherwise secured to each cross-beam E as said beam is secured in place.

Having thus described my invention, I claim as new and desire to secure by Letters Patent—

1. The supporting of the arch in the process of construction by means of two or more pairs of suspended cables, C D, substantially as herein shown and described, and for the purpose set forth.

2. The combination, with the main arch E, of the secondary arch H, the said blocks H being formed with tenons interlocking with the cross-beams E of the main arch, substantially as herein shown and described, and for the purpose set forth.

The above specification of my invention signed by me this 8th day of December, 1871.

JOHN JOHNSON.

Witnesses:
JAMES T. GRAHAM,
JOHN POULSON.